US012726613B2

(12) United States Patent
Zhao et al.

(10) Patent No.: US 12,726,613 B2
(45) **Date of Patent: *Sep. 1, 2026**

(54) MULTIPLE LISTS FOR BLOCKED BASED WEIGHTING FACTORS

(71) Applicant: Tencent America LLC, Palo Alto, CA (US)

(72) Inventors: Liang Zhao, Palo Alto, CA (US); Xin Zhao, Palo Alto, CA (US); Han Gao, Palo Alto, CA (US); Biao Wang, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,698

(22) Filed: Dec. 5, 2024

(65) Prior Publication Data

US 2025/0097408 A1 Mar. 20, 2025

Related U.S. Application Data

(63) Continuation of application No. 18/217,893, filed on Jul. 3, 2023, now Pat. No. 12,200,195.

(Continued)

(51) Int. Cl.

*H04N 19/00* (2014.01)
*H04N 19/105* (2014.01)

(Continued)

(52) U.S. Cl.

CPC ......... *H04N 19/105* (2014.11); *H04N 19/159* (2014.11); *H04N 19/176* (2014.11); *H04N 19/70* (2014.11)

(58) Field of Classification Search

CPC .. H04N 19/105; H04N 19/159; H04N 19/176; H04N 19/70; H04N 19/52; H04N 19/573; H04N 19/577

See application file for complete search history.

(56) References Cited

U.S. PATENT DOCUMENTS 5,633,956 A * 5/1997 Burl .................... H04N 19/577 375/E7.193
5,909,224 A * 6/1999 Fung .................... H04N 19/423 348/718

(Continued)

*Primary Examiner* — Frank F Huang

(74) *Attorney, Agent, or Firm* — Morgan, Lewis & Bockius LLP

(57) ABSTRACT

The various implementations described herein include methods and systems for coding video. In one aspect, a method includes receiving a video bitstream including a current coding block of a current image frame and determining that the current coding block is to be predicted in a weighted bi-prediction (WBP) mode. The method further includes in response to the current coding block being predicted in the WBP mode, determining that the current coding block is associated with two bi-prediction blocks and identifying a plurality of distinct weighting factor lists including at least a first list of positive weighting factors and a second list of mixed weighting factors. The method further includes selecting one of the weighing factor lists, identifying a first weighting factor from the weighing factor lists, and reconstructing the current image frame, including determining the current coding block by combining the two bi-prediction blocks based on the first weighting factor.

20 Claims, 7 Drawing Sheets

Related U.S. Application Data

(60) Provisional application No. 63/453,697, filed on Mar. 21, 2023.

(51) Int. Cl.
*H04N 19/159* (2014.01)
*H04N 19/176* (2014.01)
*H04N 19/70* (2014.01)

(56) References Cited

U.S. PATENT DOCUMENTS 6,493,043 B1 * 12/2002 Bollmann .......... H04N 21/4341 348/553
6,642,968 B1 * 11/2003 Ford ................ H04N 21/44004 348/715
8,559,513 B2 * 10/2013 Demos .................. H04N 19/50 375/240.15
11,611,771 B2 * 3/2023 Li .......................... H04N 19/44
11,729,417 B2 * 8/2023 Bordes .................. H04N 19/70 375/240.16
11,792,419 B2 * 10/2023 Park .................... H04N 19/109 375/240.26
11,895,314 B2 * 2/2024 Paluri .................. H04N 19/137
12,382,018 B2 * 8/2025 Gao ....................... H04N 19/52
2021/0211709 A1 * 7/2021 Zhang .................. H04N 19/132
2022/0038720 A1 * 2/2022 Hashimoto .......... H04N 19/174
2022/0124316 A1 * 4/2022 Park ....................... H04N 19/52
2022/0312028 A1 * 9/2022 Li ........................ H04N 19/577
2023/0379455 A1 * 11/2023 Lim ....................... H04N 19/56
2024/0137497 A1 * 4/2024 Lee ...................... H04N 19/159
2024/0146903 A1 * 5/2024 Gao ..................... H04N 19/176

* cited by examiner

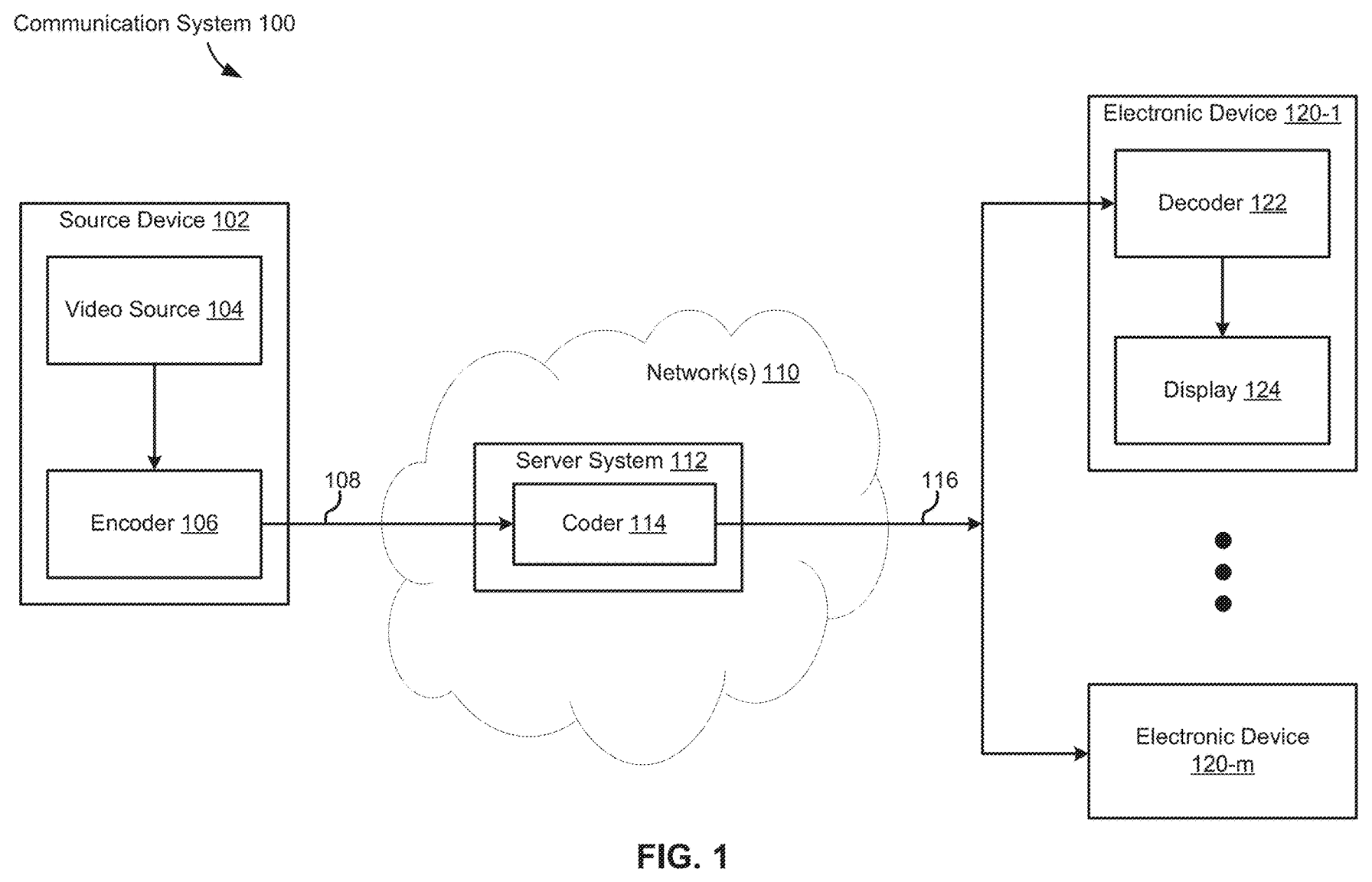

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

MULTIPLE LISTS FOR BLOCKED BASED WEIGHTING FACTORS

RELATED APPLICATIONS

This application is a continuation of U.S. patent application Ser. No. 18/217,893, filed Jul. 3, 2023, which claims priority to U.S. Provisional Patent Application No. 63/453,697, entitled "Multiple Lists for Block Based Weighting Factors," filed Mar. 21, 2023, each of which is hereby incorporated by reference in its entirety.

TECHNICAL FIELD

The disclosed embodiments relate generally to video coding, including but not limited to systems and methods for determining weighting factors of prediction blocks of a coding unit in a weighted bi-prediction (WBP) mode of inter prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes determining weighting factors of prediction blocks of a coding unit using a plurality of weighting factor lists in a WBP mode of inter prediction of video data. The WBP mode is applied to generate motion compensation data of a current coding block based on two prediction blocks that belong to the same group of pictures (GOP) with the current coding block. A target weighting factor list includes a plurality of weighting factors from which a target weighting factor may be selected to reconstruct the current coding block as a weighted combination of the two prediction blocks. In some situations, a relatively low delay is permitted for reconstruction of the current coding block, and the target weighting factor list includes only a single negative weighting factor. Conversely, in some embodiments, the plurality of weighting factor lists includes more than one mixed weighting factor lists each having at least one negative weighting factor, and the target weighting factor list of the current coding block is selected from the plurality of weighting factor lists. Additionally, in some embodiments, the plurality of weighting factor lists includes more than one positive weighting factor list. Selection of the target weighting factor list is optionally based on one or more of: directions of the two prediction blocks, a motion vector predicator (MVP) of one of the two prediction blocks, and a prediction distance of a reference image frame and the current image frame. The plurality of weighting factor lists offers different lists of weighting factors from which the target weighting factor list may be selected to facilitate combining the two prediction blocks under different application scenarios. The target weighting factor list is used to optimize performance (e.g., image quality, image size, reconstruction rate, power usage, data bandwidth, frame buffer size) of a reconstruction process of the current coding block based on the different application scenarios.

In accordance with some embodiments, a method of video decoding is provided. The method includes receiving a video bitstream including a current coding block of a current image frame and determining that the current coding block is to be predicted in a WBP mode. The method further includes, in response to the current coding block being predicted in the WBP mode, determining that the current coding block is associated with two bi-prediction blocks including a first prediction block and a second prediction block, and identifying a plurality of distinct weighting factor lists including at least a first list and a second list. The first list has all positive weighting factors. The second list has mixed weighting factors including at least one negative weighting factor, and the first list has at least one weighting factor distinct from respective weighting factors in the second list. The method further includes selecting one of the plurality of weighing factor lists based on a predefined criterion and identifying a first weighting factor from the selected one of the plurality of weighing factor lists. The method further includes reconstructing the current image frame including determining the current coding block by combining the first prediction block and the second prediction block based on the first weighting factor.

In accordance with some embodiments, a method of video encoding is provided. The method includes determining that a current coding block of a current image frame is to be encoded in a WBP mode. The method further includes in response to the current coding block being encoded in the WBP mode, determining that the current coding block is associated with two bi-prediction blocks including a first prediction block and a second prediction block and identifying a plurality of distinct weighting factor lists including at least a first list of positive weighting factors and a second list of mixed weighting factors. The second list has at least one negative weighting factor, and the first list has at least one weighting factor distinct from respective weighting factors in the second list. The method further includes selecting one of the plurality of weighing factor lists based on a predefined criterion, identifying a first weighting factor from the selected one of the plurality of weighing factor lists, and estimating the current coding block by combining the first prediction block and the second prediction block based on the first weighting factor. The method further includes generating a video bitstream including the current coding block of the current image frame.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
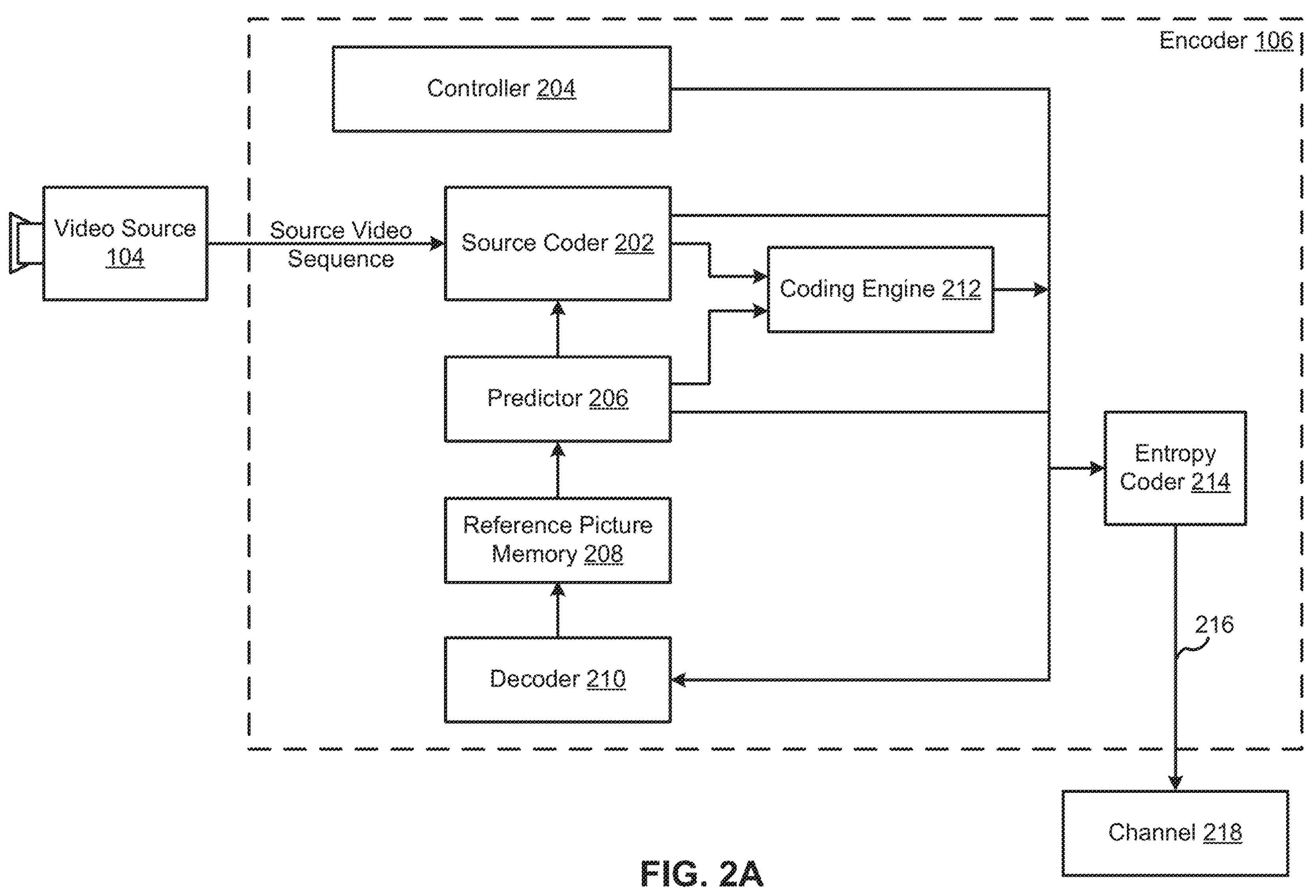
FIG. 2A is a block diagram illustrating example elements of an encoder component in accordance with some embodiments.

Various embodiments of this application are directed to determining weighting factors of prediction blocks of a coding unit using a plurality of weighting factor lists in a WBP mode of inter prediction of video data. The WBP mode is applied to generate motion compensation data of a current coding block based on two prediction blocks that belong to the same GOP with the current coding block. A target weighting factor list includes a plurality of weighting factors from which a target weighting factor is selected to reconstruct the current coding block as a weighted combination of the two prediction blocks. In some situations, the target weighting factor list includes only a single negative weighting factor. Conversely, in some embodiments, the plurality of weighting factor lists includes more than one mixed weighting factor lists each having at least one negative weighting factor, and the target weighting factor list of the current coding block is selected from the plurality of weighting factor lists. Additionally, in some embodiments, the plurality of weighting factor lists includes more than one positive weighting factor list. Selection of the target weighting factor list is optionally based on one or more of: directions of the two prediction blocks, a MVP of one of the two prediction block, and a prediction distance of a reference image frame and the current image frame. The plurality of weighting factor lists offers different lists of weighting factors from which the target weighting factor list is selected to facilitate combining the two prediction blocks under different application scenarios. The target weighting factor list is used to optimize performance (e.g., image quality, image size, reconstruction rate, power usage, data bandwidth, frame buffer size) of a reconstruction process of the current coding block based on the different application scenarios.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference image frames. In this manner, the coding engine 212 codes differences between pixel blocks of an input frame and pixel blocks of reference image frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference image frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference image frames and may cause reconstructed reference image frames to be stored in the reference picture memory 208. In this manner, the encoder component 106 stores copies of reconstructed reference image frames locally that have common content as the reconstructed reference image frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
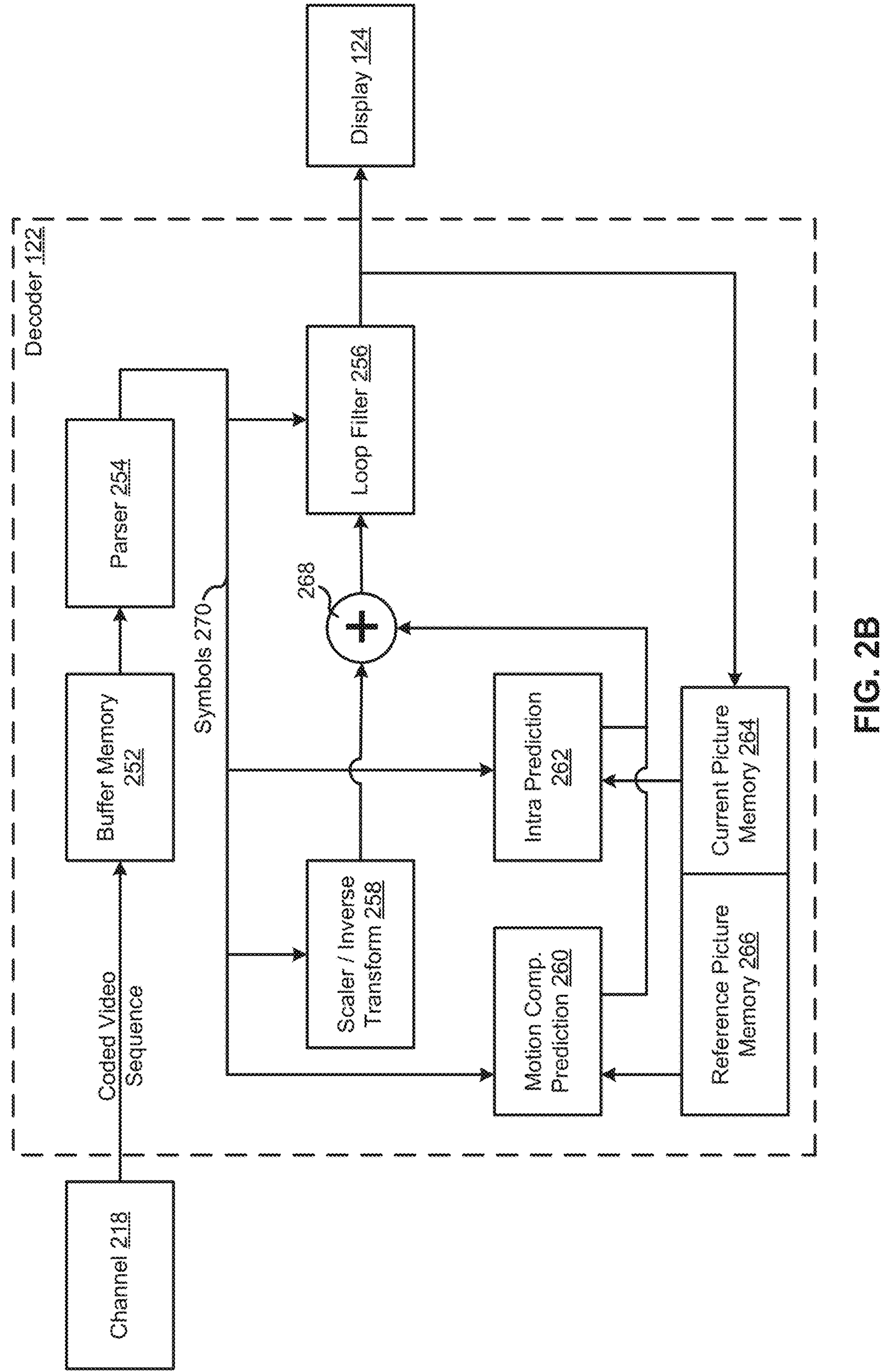
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
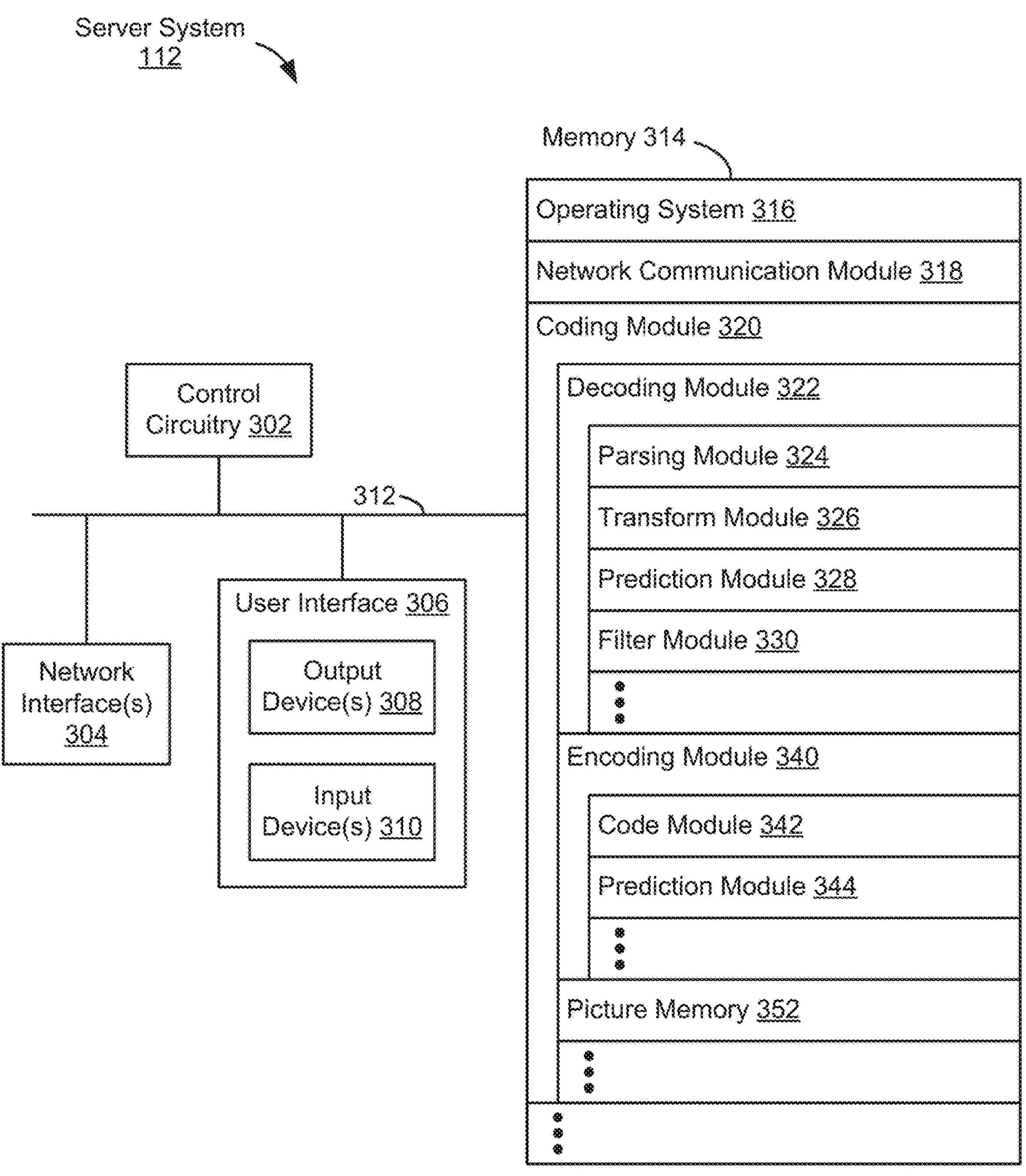
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
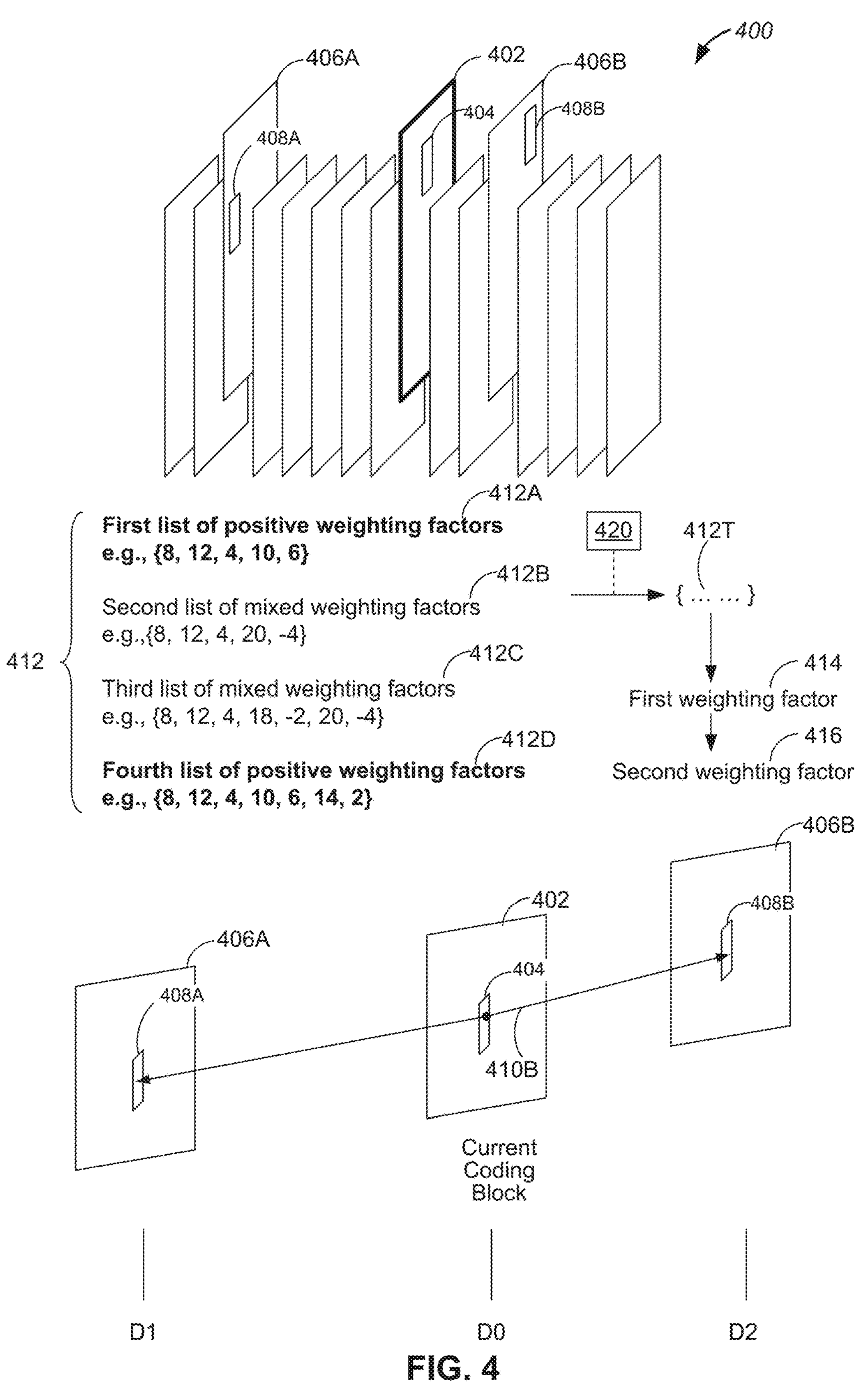
FIG. 4 illustrates an example weighted bi-prediction scheme applied to generate a current coding block with two prediction blocks located on the same direction of the current coding block in a group of pictures, in accordance with some embodiments.

FIG. 4 illustrates an example WBP scheme 400 applied to generate a current coding block 404 with two prediction blocks 408 located on the same direction of the current coding block 404 in a GOP, in accordance with some embodiments. The GOP includes a sequence of image frames. The sequence of image frames includes a current image frame 402 that further includes the current coding block 404. The current coding block 404 is encoded based on prediction data of one or more coding blocks of one or more reference images 406 in the GOP. In some embodiments, WBP is applied to encode the current coding block 404. For example, the current coding block 404 is encoded based on prediction data of two prediction blocks 408A and 408B of two reference image frames 406A and 406B in the GOP in a weighted manner. In an example, the current coding block 404 is temporally located between a first prediction block 408A of a first reference image frame 406A and a second prediction block 408B of a second reference image frame 406B. In some situations (FIG. 4), one of the prediction blocks 408A and 408B precedes the current coding block 404, and the other one of the reference prediction blocks 408A and 408B follows the current coding block 404. Each reference image frame 406A or 406B is immediately next to the current image frame 402 or separated from the current image frame 402 by a number of frames. Specifically, the first prediction block 408A optionally precedes or follows the current coding block 404, and is optionally immediately adjacent to, or separated by a number of frames from, the current coding block 404.

In some embodiments, a coding standard of HEVC is applied, and a bi-prediction signal including a video bitstream is generated by averaging two prediction blocks of two different reference pictures and/or using two different motion vectors. In some embodiments, another coding standard of VVC is applied, and a WBP mode is extended beyond averaging to allow averaging of the two prediction blocks 408A and 408B in a weighted manner as follows:

$$P_C = ((8-w)*P_0 + w*P_1 + 4) >> 3 \quad (1)$$

wherein $P_C$, $P_0$, and $P_1$ represent prediction data of the current coding block 404, the first prediction block 408A, and the second prediction block 408B, respectively, and w is a target weighting factor applied to combine the first and second prediction blocks 408A and 408B ($P_0$ and $P_1$) in a weighted manner. In an example, a list of five mixed weight values, {−2, 3, 4, 5, 10}, is allowed in WBP, and the target weighting factor w belongs to the list of five mixed weight values, i.e., $w \in \{-2, 3, 4, 5, 10\}$, where a unit is ⅛. In some situations, the list of mixed weight values includes at least one negative weighting factor (e.g., −2). When w is equal to 4, equal weighting factors are used to average the two prediction blocks 408A and 408B. In some embodiments, for each bi-predicted coding unit (e.g., the current coding block 404), the target weighting factor w is determined in one of two ways. For a non-merge coding unit, a weight index is signaled after a motion vector difference (MVD) in the video bitstream. Alternatively, for a merge coding unit, the weight index is inferred from neighboring blocks based on a merge candidate index. In some embodiments, WBP is applied on a coding unit level, in accordance with a determination with each corresponding coding unit has 256 or more luma samples (i.e., in accordance with a determination with a product of a coding unit width and a coding unit height is greater than or equal to 256). In some embodiments, a current image frame 402 has a delay that is lower than a threshold delay, and the list of mixed weighting factors is used to select the target weighting factor w of the current image frame 402. Alternatively, in some embodiments, the current image frame 402 has a delay that is not limited by the threshold delay, and a list of positive weighting factors is used to select the target weighting factor w of the current image frame 402. For example, the list of positive weighting factors includes {3,4,5}, which is optionally a subset of {−2, 3, 4, 5, 10}. In another example, the list of positive weighting factors has at least one positive weighting factor that is distinct from any weighting factor in {-2, 3, 4, 5, 10}.

In some embodiments, a decoder 122 of an electronic device 120 (FIG. 1) receives a video bitstream including a current coding block 404 of a current image frame 402 and determines that the current coding block 402 is to be predicted in a WBP mode. In response to the current coding block 402 being predicted in the WBP mode, the decoder 122 determines that the current coding block 402 is associated with two bi-prediction blocks 408 including a first prediction block 408A of a first reference image 406A and a second prediction block 408B of a second reference image 406B. A plurality of distinct weighting factor lists 412 are identified, and includes at least a first list of positive weighting factors 412A and a second list of mixed weighting factors 412B. All weighting factors in the first list of positive weighting factors 412A are greater than 0, and the second list 412B has at least one negative weighting factor (e.g., −4) The first list 412A has at least one weighting factor distinct from respective weighting factors in the second list 412B. For example, the first list 412A is {8, 12, 4, 10, 6}, and the second list is {8, 12, 4, 20, −4}. The first list 412A has two weighting factors (10 and 6), which are not included in the second list 412B. In some embodiments, the plurality of distinct weighting factor lists 412 further includes one or more third lists of mixed weighting factors 412C each having more negative weighting factors than the second list 412B.

The decoder 122 selects one of the plurality of weighing factor lists 412T (i.e., a target weighting factor list 412T) based on a predefined criterion 420, and identifies a first weighting factor 414 (i.e., a target weighting factor w) from the selected one of the plurality of weighing factor lists 412T. The current image frame 402 is reconstructed. The current coding block 404 is determined by combining the first prediction block 408A and the second prediction block 408B based on the first weighting factor 414. In some embodiments, the first weighting factor 414 is associated with the first prediction block 408A. A second weighting factor 416 of the second prediction block 408B is determined based on the first weighting factor 414 of the first prediction block 408A. For example, a unit of the selected one of the plurality of weighting factor lists $$412T \text{ is } \frac{1}{16}.$$

A sum of the first weighting factor 414 and the second weighting factor 416 is equal to 16. In another example, the unit of the selected one of the plurality of weighting factor lists 412T is 1. A sum of the first weighting factor 414 and the second weighting factor 416 is equal to 1. The first prediction block 408A and the second prediction block 408B are combined using the first weighting factor 414 and the second weighting factor 416, e.g., based on equation (1).

In some embodiments, in accordance with a determination that the first prediction block 408A and the second prediction block 408B have different directions with respect to the current image frame 404, the decoder 122 selects the first list of positive weighting factors 412A, e.g., over the second list 412B, based on the predefined criterion 420. For example, referring to FIG. 4, the first reference image frame 406A including the first prediction block 408A precedes the current image frame 402, and the second reference image frame 406B including the second prediction block 408B follows the current image frame 402. The first list 412 including only positive weighting factors is used to determine the first weighting factor 414. In some embodiments, the predefined criterion 420 is associated with directions of the two prediction blocks 408 and a prediction distance of the first prediction block 408A. In accordance with a determination that the first prediction block 408A and the second prediction block 408B have different directions with respect to the current image frame 404, the decoder 122 selects the first list of positive weighting factors 412A based on a prediction distance of the first prediction block 408A. Further, in some embodiments, the prediction distance is measured (1) between a first reference image frame 406A including the first prediction block 408A and the current image frame 402 (e.g., represented as |D1-D0|) or (2) between the first reference image frame 406A and a second reference image frame 406B including the second prediction block 408B (e.g., represented as |D1-D2|), where temporal locations of the image frames 402, 406A, and 406B are represented by D0, D1, and D2. In some embodiments, the prediction distance includes a picture order count (POC) distance measured by a number of image frames.

In some embodiments, the plurality of weighting factor lists 412 further includes a fourth list of positive weighting factors 412D having more weighting factors than the first list of positive weighting factors 412A. All weighting factors in the fourth list 412D are greater than 0. In accordance with a determination that the prediction distance is less than a threshold distance, the first list of positive weighting factors 412A is selected to provide the first weighting factor 414. In accordance with a determination that the prediction distance is equal to or greater than the threshold distance, the fourth list of positive weighting factors 412D is selected to provide the first weighting factor 414. In this example, the first list 412A is {8, 12, 4, 10, 6}, and the fourth list 412D is {8, 12, 4, 10, 6, 14, 2}, having 2 more positive weighting factors than the first list 412A.

Alternatively, in some embodiments, the predefined criterion 420 is associated with directions of the two prediction blocks 408 and a list indicator in a syntax. The plurality of weighting factor lists 412 further includes one or more fourth lists of positive weighting factors 412D in addition to the first list of positive weighting factors 412A. In accordance with a determination that the first prediction block 408A and the second prediction block 408B have different directions with respect to the current image frame 402, the decoder 122 selects one of the first and fourth lists of positive weighting factors 412A and 412D based on a list indicator in a syntax, which is signaled with the current image frame 402.

Additionally and alternatively, the plurality of weighting factor lists 412 further includes one or more fourth lists of positive weighting factors 412D in addition to the first list of positive weighting factors 412A. The predefined criterion 420 is associated with directions of the two prediction blocks 408 and a parity of a motion vector predicator (MVP) index. In accordance with a determination that the first prediction block 408A and the second prediction block 408B have different directions with respect to the current image frame 402, one of the first and fourth lists 412A and 412D of positive weighting factors (i.e., the target weighting factor list 412T) is selected based on a parity of an MVP index selecting an MVP of the first predication block 408A from a predefined MVP list. It is noted that the first prediction block 408A optionally precedes or follows the current image frame 402 in the GOP. Further, in some embodiments, the plurality of weighting factor lists 412 further includes a single fourth list 412D of positive weighting factors. In accordance with a determination that the MVP index is odd, the decoder 122 selects one of the first and fourth lists of positive weighting factors 412A and 412D. In accordance with a determination that the MVP index is even, the decoder 122 selects the other one of the first and fourth lists of positive weighting factors 412A and 412D.

Referring to FIG. 4, in an example, the first list 412A is {8, 12, 4, 10, 6}, and the fourth list 412D is {8, 12, 4, 10, 6, 14, 2}, where a unit is $$\frac{1}{16}.$$

In accordance with a determination that the MVP index is odd, the decoder 122 selects the first list of positive weighting factors 412A as the target weighting factor list 412T, and in accordance with a determination that the MVP index is even, the decoder 122 selects the fourth list of positive weighting factors 412D as the target weighting factor list 412T.

Figure 5:
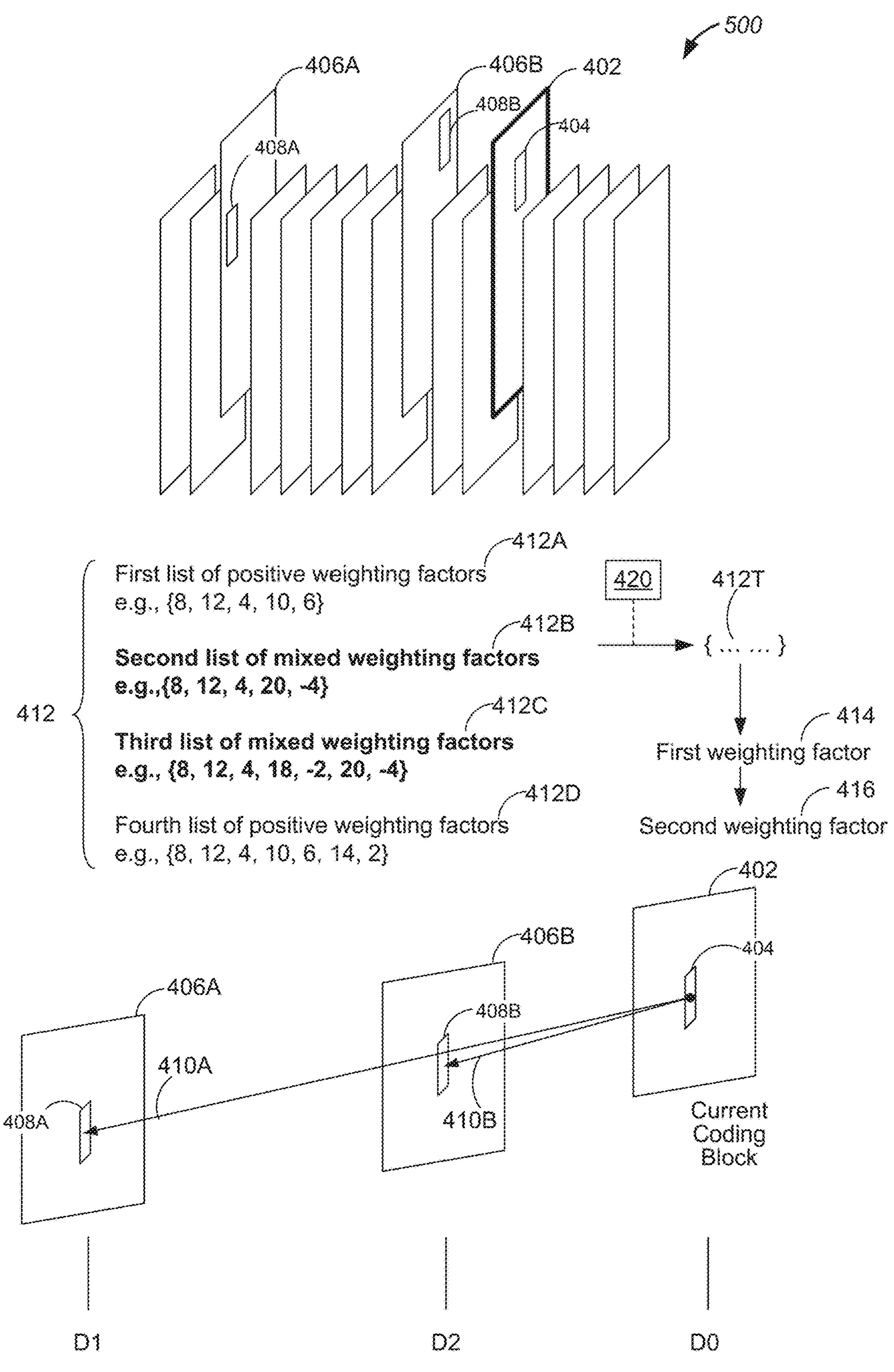
FIG. 5 illustrates another example weighted bi-prediction scheme applied to generate a current coding block with two prediction blocks located on opposite directions of the current coding block in a group of pictures, in accordance with some embodiments.

FIG. 5 illustrates another example weighted bi-prediction scheme 500 applied to generate a current coding block 404 with two prediction blocks 408 located on opposite directions of the current coding block 404 in a GOP, in accordance with some embodiments. A decoder 122 of an electronic device 120 (FIG. 1) receives a video bitstream including a current coding block 404 of a current image frame 402 and determines that the current coding block 402 is to be predicted in a WBP mode. In response to the current coding block 402 being predicted in the WBP mode, the decoder 122 determines that the current coding block 402 is associated with two bi-prediction blocks 408 including a first prediction block 408A of a first reference image 406A and a second prediction block 408B of a second reference image 406B. A plurality of distinct weighting factor lists 412 are identified, and includes at least a first list of positive weighting factors 412A and a second list of mixed weighting factors 412B. All weighting factors in the first list of positive weighting factors 412A are greater than 0, and the second list 412B has at least positive weighting factor and at least one negative weighting factor (e.g., −4). The first list 412A has at least one weighting factor distinct from respective weighting factors in the second list 412B. The decoder 122 selects one of the plurality of weighing factor lists 412T (i.e., a target weighting factor list 412T) based on a predefined criterion 420, and identifies a first weighting factor 414 (i.e., a target weighting factor w) from the selected one of the plurality of weighing factor lists 412T. The current image frame 402 is reconstructed. The current coding block 404 is determined by combining the first prediction block 408A and the second prediction block 408B based on the first weighting factor 414.

In some embodiments, the predefined criterion 420 is associated with directions of the two prediction blocks 408 and a prediction distance of the first prediction block 408A. In accordance with a determination that the first prediction block 408A and the second prediction block 408B have the same direction with respect to the current image frame 402, the one of the plurality of weighing factor lists 412T is selected based on a prediction distance of the first prediction block 408A. Both of the prediction blocks 408 precede or follow the current image frame 402. The prediction distance is measured (1) between a first reference image frame 406 including the first prediction block 408A and the current image frame 402 (e.g., represented by |D1-D0|) or (2) between the first reference image frame 406A and a second reference image frame 406B including the second prediction block 408B (e.g., represented by |D1-D2|), where temporal locations of the image frames 402, 406A, and 406B are represented by D0, D1, and D2. Alternatively, in some embodiments, the plurality of weighting factor lists 412 further includes a third list of mixed weighting factors 412C having more negative weighting factors than the second list of mixed weighting factors 412B. For example, the second list of mixed weighting factors 412B is {8, 12, 4, 20, −4}, and the third list of mixed weighting factors 412C is {8, 12, 4, 18, −2, 20, −4}, having one more negative weighting factor than the second list 412B. In accordance with a determination that the prediction distance is less than a threshold distance (e.g., 2 image frames apart), the decoder 122 selects the second list of mixed weighting factors 412B. In accordance with a determination that the prediction distance is equal to or greater than the threshold distance, the decoder 122 selects the third list of mixed weighting factors 412C.

In some embodiments, the predefined criterion 420 is associated with directions of the two prediction blocks 408 and a list indicator in a syntax. The plurality of weighting factor lists 412 further includes one or more third lists of mixed weighting factors 412C each having one or more negative weighting factors. In accordance with a determination that the first prediction block 408A and the second prediction block 408B have the same direction with respect to the current image frame 402, one of the second and third lists 412B and 412C of mixed weighting factors is selected as a target weighting factor list 412T based on a list indicator in a syntax, which is signaled with the current image frame.

In some embodiments, the plurality of weighting factor lists 412 further includes one or more third lists 412C of mixed weighting factors. Each mixed weighting factor 412B or 412C has one or more positive weighting factors and one or more negative weighting factors. The predefined criterion 420 is associated with directions of the two prediction blocks 408 and a parity of a motion vector predicator (MVP) index. In accordance with a determination that the first prediction block 408A and the second prediction block 408B have the same direction with respect to the current image frame 402, one of the second and third lists of mixed weighting factors 412B and 412C is selected as the target weighting factor list 412T based on a parity of an MVP index, which selects an MVP of the first predication block from a predefined MVP list. In some embodiments, the plurality of weighting factor lists 412 further includes a single third list of mixed weighting factors 412C having one or more negative weighting factors. In accordance with a determination that the MVP index is odd, the decoder 122 selects one of the second and third lists of mixed weighting factors 412B and 412C, and in accordance with a determination that the MVP index is even, the decoder 122 selects the other one of the second and third lists of mixed weighting factors 412B and 412C.

Referring to FIG. 5, in an example, the second list 412B is {8, 12, 4, 20, −4}, and the third list 412C is {8, 12, 4, 18, −2, 20, −4}. In accordance with a determination that the MVP index is odd, the decoder 122 selects the second list of mixed weighting factors 412B as the target weighting factor list 412T, and in accordance with a determination that the MVP index is even, the decoder 122 selects the third list of mixed weighting factors 412C as the target weighting factor list 412T.

The first list of positive weighting factors 412A has a first number of positive weighting factors, and the second list of mixed weighting factors 412B has a second number of weighting factors. In some embodiments, the first number is not equal to the second number. Alternatively, in some embodiments, the first number is equal to the second number. For example, the first list of positive weighting factors is {8, 12, 4, 10, 6, 14, 2}, and the second list of mixed weighting factors is {8, 12, 4, 18, −2, 20, −4}. In another example, the first list of positive weighting factors is {8, 12, 4, 10, 6}, and the second list of mixed weighting factors is {8, 12, 4, 20, −4}. In yet another example, the first list of positive weighting factors is {8, 12, 4, 10, 6}, and the second list of mixed weighting factors is {8, 10, 6, 20, −4}

In some embodiments, the plurality of distinct weighting factor lists 412 corresponds to a set of common weighting factors that is included in each of the plurality of distinct weighting factor lists. Each of the plurality of distinct weighting factor lists 412 further includes a respective set of unique weighting factors. Each unique weighting factor is not included in at least one of the plurality of distinct weighting factor lists. For example, referring to FIG. 5, the set of common weighting factors includes 8, 12, and 4. The first list 412 includes unique weighting factors of 10 and 6, and the second list 412B includes unique weighting factors of 20 and −4.

Figure 6:
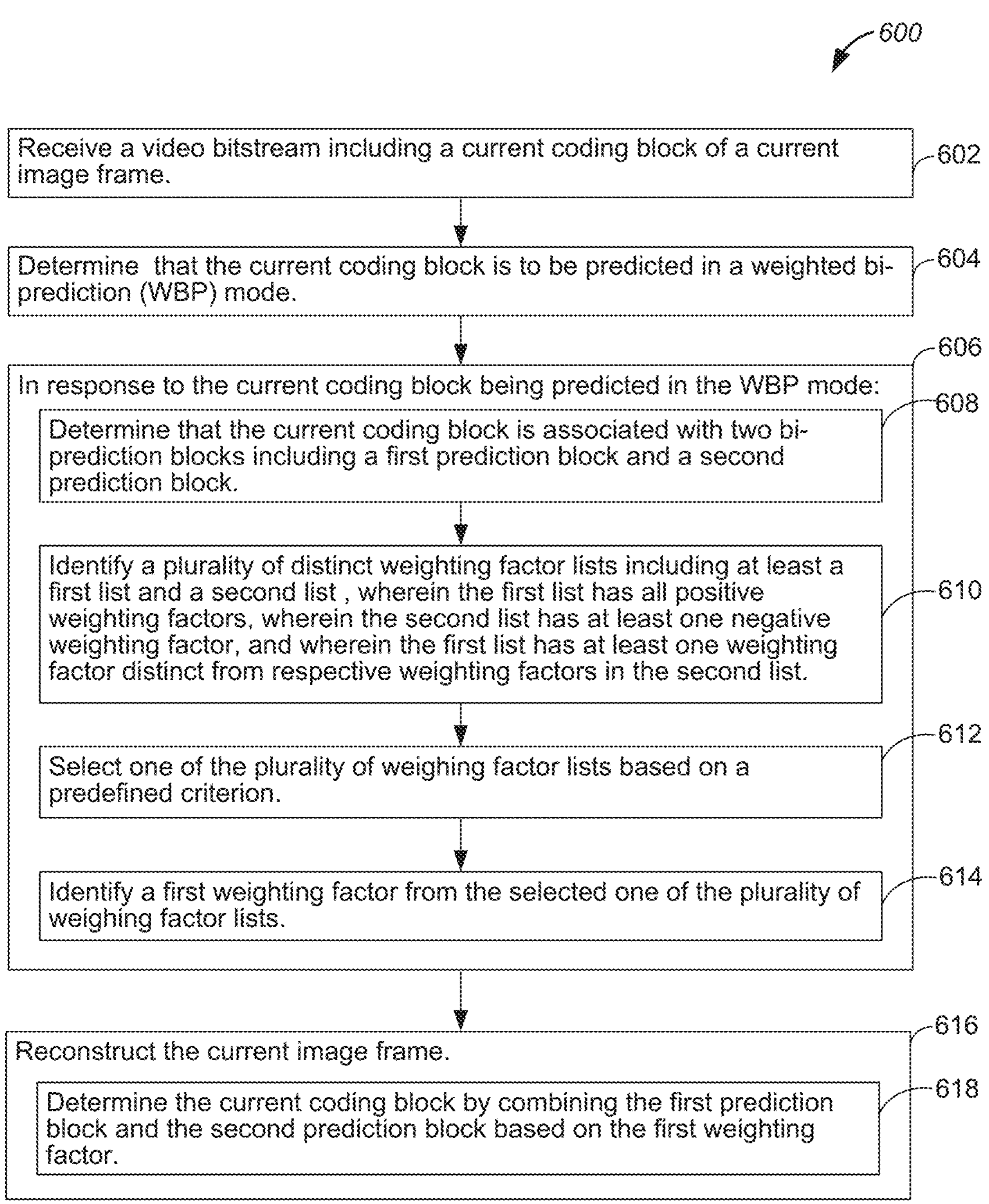
FIG. 6 is a flow diagram of a method of coding video, in accordance with some embodiments.

FIG. 6 is a flow diagram illustrating a method 600 of coding video, in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the coding module 320 of the memory 314) of the computing system. In some embodiments, a current image frame 402 includes a current coding block 404. Weighted bi-prediction is applied to generate a current coding block by averaging, in a weighted manner, two prediction blocks included in the same GOP as the current coding block 404. This application is directed to selecting a target list of weighting factors 412T, from which a target weighting factor w (414) is further selected, among a plurality of weighting factor lists 412 based on parameters of the current coding block 404 and associated prediction blocks 408. For the current coding block 404, each of the two prediction blocks 408 is included in a respective reference image frame 406 having a direction measured with reference to the current image frame 402, and the direction is determined based on whether the respective reference image frame 406 precedes or follows the current image frame 402 in accordance with a display order of the GOP.

In some embodiments, WBP is implemented on a block level (e.g., to coding blocks). A plurality of weighting factor lists 412 is applied to determine a target weighting factor list 412T from which a target weighting factor (e.g., a first weighting factor 414) is selected. In some embodiments, determination on which weighting factor list is employed for a current coding block 404 (i.e., the target weighting factor list 412T) depends on one or more of: a direction of a reference image frame 406, a picture order count (POC) distance between a reference image frame 406 and the current image frame 402, a quantization parameter (QP)

difference between a reference image frame 406 and the current image frame 402, and a temporal layer index of a reference image frame 406.

In some embodiments, the target weighting factor list 412T is selected from at least two weighting factors lists (e.g., 412A and 412B). There is at least one negative weighting factor in one of the weighting factor lists (e.g., 412B), and all of the weighting factors in one of the weight factor lists (e.g., 412A) are all positive values. Stated another way, in some embodiments, the plurality of weighting factor lists 412 includes at least a first list of positive weighting factors 412A and a second list of mixed weighting factors 412B. The first list 412A includes only positive weighting factors, while the second list 412B includes at least one negative weighting factor. Further, in some embodiments, the target weighting factor list 412T is selected from at least 3 weighting factor lists (e.g., 412A, 412B, and 412C). All the weighting factors are positive integers for the first list 412A, and there is only one weighting factor with negative integer in the second list 412B, and there is more than one weighting factor with negative integer in a third list 412C. Stated another way, the plurality of weighting factor lists 412 includes at least the first list 412A of positive weighting factors, the second list 412B of mixed weighting factors, and the third list 412C of mixed weighting factors. The first list 412A includes only positive weighting factors, while the second list 412B includes at least one negative weighting factor and the third list 412C includes two or more negative weighting factors.

In some embodiments, in accordance with a determination that the directions of two reference image frames 406A and 406B are different, e.g., in FIG. 4, a decoder 122 employs the weighting factor list 412A with all positive integers to reconstruct the current coding block 404. Otherwise, in accordance with a determination that the two reference image frames 406A and 406B have the same directions with respect to the current image frame 402, e.g., in FIG. 5, the decoder 122 employs the weighting factor list 412B or 412C with at least one of the negative integers.

In some embodiments, in accordance with the directions of two reference image frames 406A and 406B are the same and there are more than one weighting factor lists (e.g., 412B and 412C) with negative weighting factors, the decoder 122 selects the target weighting factor list 412T from the plurality of weighting factor lists 412 based on a picture order count (POC) distance between the reference image frames 406 and the current image frame 402. The POC distance is measured by a number of image frames. For example, if there are more than one reference image frames (e.g., 406A and 406B) for the current coding block 404, each reference image frame 406 has a POC distance from the current image frame 402. Locations of the current image frame 402 and the reference image frames 406A and 406B are denoted as D0, D1, and D2. The POC distances of the reference image frames 406A and 406B from the current image frame 402 are denoted as D0-D1, D0-D2. The POC distance between the reference image frames 406A and 406B is denoted as D1-D2. In accordance with a determination that a predefined one of the POC distances (which is one of D0-D1, D0-D2, and D1-D2) is greater than a threshold distance, the decoder 122 selects a list having more negative weighting factors (e.g., 412C) as the target weighting factor list.

Alternatively, in some embodiments, in accordance with the directions of two reference image frames 406A and 406B are the same and there are more than one weighting factor lists (e.g., 412B and 412C) with negative weighting factors, selection on which weighting factor list is employed for current block (i.e., information of the target weighting factor list 412T) is signaled into the bitstream transferred from an encoder 106 to the decoder 122. Alternatively, in some embodiments, in accordance with the directions of two reference image frames 406A and 406B are the same and there are more than one weighting factor lists (e.g., 412B and 412C) with negative weighting factors, the target weighting factor list 412T is selected from the plurality of weighting factor lists 412 based on an index of a selected MVP in an MVP list. For example, the target weighting factor list 412T is selected for the current coding block 404 based on a parity of an MVP index (e.g., in accordance with a determination whether the index of the selected MVP in the MVP list is even or odd).

In some embodiments, the plurality of weighting factor lists 412 includes at least two weighting factor lists 412C and 412D. A list 412D of positive weighting factors includes {8, 12, 4, 10, 6, 14, 2}. A list 412C of mixed weighting factors includes {8, 12, 4, 18, −2, 20, −4} and has at least one negative weighting factor and at least one positive weighting factor. Each of the plurality of weighting factor lists has a unit $$\left(\text{e.g., } \frac{1}{16}\right),$$

and each weighting factor is divided by 16

$$\left(\text{i.e., multiplied by } \frac{1}{16}\right)$$

before it is applied to combine the two prediction blocks 408A and 408B. In some embodiments, weighting factors in each weighting factor list 412 are organized in a random order without impacting selection of the target weighting factor list 412T. The target weighting factor is selected from the target weighting factor list 412T, independently of an order of the target weighting factor list 412T.

In some embodiments, the plurality of weighting factor lists 412 includes at least two weighting factor lists 412A and 412B. A first list 412A of positive weighting factors includes {8, 12, 4, 10, 6}, and a second list 412B of mixed weighting factors includes {8, 12, 4, 20, −4} and has at least one negative weighting factor and at least one positive weighting factor. Alternatively, in some embodiments, the plurality of weighting factor lists 412 includes at least two weighting factor lists. A first list 412A of positive weighting factors includes {8, 12, 4, 10, 6}, and a second list 412B of mixed weighting factors includes {8, 10, 6, 20, −4}. Alternatively and additionally, in some embodiments, the plurality of weighting factor lists 412 includes at least three weighting factor lists 412A, 412B, and 412C. A first list 412A of positive weighting factors includes {8, 12, 4, 10, 6, 14, 2}, and a second list 412B of mixed weighting factors includes {8, 12, 4, 10, 6, 20, −4}. A third list 412C of mixed weighting factors includes {8, 12, 4, 18, −2, 20, −4}. The third list 412C includes two negative weighting factors, and the second list 412B includes a single negative weighting factor. In some embodiments, weighting factors in each weighting factor list 412 are organized in a random order without impacting selection of the target weighting factor list 412T.

In some embodiments, determination of the target weighting factor list 412T depends on previously parsed information (e.g., a compound mode, a motion mode, a joint motion vector difference (JMVD) scaling index). Stated another way, in some embodiments, the target weighting factor list 412T is selected from the plurality of weighting factor lists 412 based on whether the compound mode is applied and whether block-level weighted prediction is applicable to the compound mode. In some embodiments, the target weighting factor list 412T is selected from the plurality of weighting factor lists 412 based on whether the motion mode is applied and whether block-level weighted prediction is applicable to the motion mode. In some embodiments, the target weighting factor list 412T is selected from the plurality of weighting factor lists 412 based on a JMVD scaling index and whether block-level weighted prediction is applicable to a JMVD mode.

In some embodiments, the target weighting factor list 412T is selected from the plurality of weighting factor lists 412 based on directions of two reference image frames 406 and an MVP index identifying an MVP in an MVP list for the current coding block 404.

In some embodiments, in accordance with a determination that the directions of two reference image frames 406A and 406B are different, the decoder 122 selects the target weighting factor list 412T from a first set of positive weighting factor lists (e.g., including 412A and 412D). All weighting factors in each positive weighting factor list are positive. Further, in some embodiments, the MVP index associated with the MVP list is applied to select the target weighting factor list 412T. For example, in accordance with a determination that the MVP index is even, the decoder 122 selects the first weighting factor list 412A as the target weighting factor list 412T. Alternatively, in accordance with a determination that the MVP index is odd, the decoder 122 selects the fourth weighting factor list 412D as the target weighting factor list 412T.

Alternatively, in accordance with a determination that the directions of two reference image frames 406A and 406B are the same, the decoder 122 selects the target weighting factor list 412T from a second set of mixed weighting factor lists (e.g., including 412B and 412C), which is distinct from the first set of positive weighting factor lists. Each mixed weighting factor list includes at least one positive weighting factor and at least one negative weighting factor. Further, in some embodiments, the MVP index associated with the MVP list is applied to select the target weighting factor list 412T. For example, in accordance with a determination that the MVP index is even, the decoder 122 selects the second weighting factor list 412B as the target weighting factor list 412T. Alternatively, in accordance with a determination that the MVP index is odd, the decoder 122 selects the third weighting factor list 412C as the target weighting factor list 412T.

In some embodiments, lengths of weighting factor lists are the same among all the supported weighting factor lists of the plurality of weighting factor lists 412.

In some embodiments, the plurality of weighting factor lists 412 corresponds to a first subset of common weighting factors (also called equal weighting factors) that are used in all of the supported weighting factor lists. In some embodiments, each weighting factor list 412 includes at least one unequal weighting factor that is not included in at least one remaining weighting factor list of the respective weighting factor list 412. In some embodiments, one of the plurality of weighting factor lists 412 includes the subset of common weighting factors, but does not include any unequal weighting factor. Each remaining weighting factor list of the one of the plurality of weighting factor lists 412 includes at least one unequal weighting factor.

In some embodiments, the target weighting factor list 412T is selected in accordance with a determination whether the index of MVP in the MVP list is even or odd. For example, when the directions of two reference image frames are different, two positive weighting factor lists 412A and 412D are supported. One positive weighting factor list 412A is {8, 12, 4}, and the other positive weighting factor list 412D is {8, 10, 6}. The first positive weighting factor list 412A is used when the index of MVP in MVP list is an even number. Otherwise, the second positive weighting factor list 412D is employed.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method 600 implemented (e.g., by a decoding module 322 in FIG. 3) for processing video data. The method 600 includes receiving (602) a video bitstream including a current coding block of a current image frame and determining (604) that the current coding block is to be predicted in a WBP mode. The method further includes in response (606) to the current coding block being predicted in the WBP mode, determining (608) that the current coding block is associated with two bi-prediction blocks including a first prediction block and a second prediction block and identifying (610) a plurality of distinct weighting factor lists including at least a first list and a second list. The first list has all positive weighting factors. The second list has mixed weighting factors including at least one positive weighting factor and at least one negative weighting factor, and the first list has at least one weighting factor distinct from respective weighting factors in the second list. The method further includes selecting (612) one of the plurality of weighing factor lists based on a predefined criterion and identifying (614) a first weighting factor from the selected one of the plurality of weighing factor lists. The method further includes reconstructing (616) the current image frame including determining (618) the current coding block by combining the first prediction block and the second prediction block based on the first weighting factor.

(A2) In some embodiments of A1, the method 600 further includes associating the first weighting factor with the first prediction block and determining a second weighting factor of the second prediction block based on the first weighting factor of the first prediction block. The first prediction block and the second prediction block are combined using the first weighting factor and the second weighting factor, respectively.

(A3) In some embodiments of A2, a sum of the first weighting factor and the second weighting factor is equal to 1.

(A4) In some embodiments of any of A1-A3, selecting the one of the plurality of weighing factor lists based on the predefined criterion further includes in accordance with a determination that the first prediction block and the second prediction block have different directions with respect to the current image frame, selecting the first list of positive weighting factors.

(A5) In some embodiments of any of A1-A3, selecting the one of the plurality of weighing factor lists based on the predefined criterion further includes in accordance with a determination that the first prediction block and the second prediction block have the same direction with respect to the current image frame, selecting the one of the plurality of weighing factor lists based on the predefined criterion based on a prediction distance of the first prediction block.

(A6) In some embodiments of A5, wherein the prediction distance is measured (1) between a first reference image frame including the first prediction block and the current image frame or (2) between the first reference image frame and a second reference image frame including the second prediction block.

(A7) In some embodiments of A5 or A6, the plurality of weighting factor lists further includes a third list of mixed weighting factors having more negative weighting factors than the second list of mixed weighting factors. Selecting the one of the plurality of weighing factor lists based on the predefined criterion further includes one of: in accordance with a determination that the prediction distance is less than a threshold distance, selecting the second list of mixed weighting factors and in accordance with a determination that the prediction distance is equal to or greater than the threshold distance, selecting the third list of mixed weighting factors.

(A8) In some embodiments of any of A1-A3, the plurality of weighting factor lists further includes one or more third lists of mixed weighting factors each having one or more negative weighting factors. Selecting the one of the plurality of weighing factor lists based on the predefined criterion further includes in accordance with a determination that the first prediction block and the second prediction block have the same direction with respect to the current image frame, selecting one of the second and third lists of mixed weighting factors based on a list indicator in a syntax signaled with the current image frame.

(A9) In some embodiments of any of A1-A3, the plurality of weighting factor lists further includes one or more third lists of mixed weighting factors each having one or more negative weighting factors. Selecting the one of the plurality of weighing factor lists based on the predefined criterion further includes in accordance with a determination that the first prediction block and the second prediction block have the same direction with respect to the current image frame, selecting one of the second and third lists of mixed weighting factors based on a parity of an MVP index selecting a MVP of the first predication block from a predefined MVP list.

(A10) In some embodiments of A9, the plurality of weighting factor lists further includes a third list of mixed weighting factors having one or more negative weighting factors. Selecting the one of the plurality of weighing factor lists based on the predefined criterion further includes one of: in accordance with a determination that the MVP index is odd, selecting one of the second and third lists of mixed weighting factors and in accordance with a determination that the MVP index is even, selecting the other one of the second and third lists of mixed weighting factors.

(A11) In some embodiments of any of A1-A10, the first list of positive weighting factors has a first number of positive weighting factors, and the second list of mixed weighting factors has a second number of weighting factors. The first number is equal to the second number. For example, the first list of positive weighting factors is {8, 12, 4, 10, 6, 14, 2}, and the second list of mixed weighting factors is {8, 12, 4, 18, −2, 20, −4}. In another example, the first list of positive weighting factors is {8, 12, 4, 10, 6}, and the second list of mixed weighting factors is {8, 12, 4, 20, −4}. In yet another example, the first list of positive weighting factors is {8, 12, 4, 10, 6}, and the second list of mixed weighting factors is {8, 10, 6, 20, −4}

(A12) In some embodiments of any of A1-A11, the plurality of distinct weighting factor lists corresponds to a set of common weighting factors that is included in each of the plurality of distinct weighting factor lists. Each of the plurality of distinct weighting factor lists further includes a respective set of unique weighting factors. Each unique weighting factor is not included in at least one of the plurality of distinct weighting factor lists.

(A13) In some embodiments of any of A1-A4 and A11-A12, selecting the one of the plurality of weighing factor lists based on the predefined criterion further includes in accordance with a determination that the first prediction block and the second prediction block have different directions with respect to the current image frame, selecting the one of the plurality of weighing factor lists based on the predefined criterion based on a prediction distance of the first prediction block.

(A14) In some embodiments of A13, the prediction distance is measured (1) between a first reference image frame including the first prediction block and the current image frame or (2) between the first reference image frame and a second reference image frame including the second prediction block.

(A15) In some embodiments of A13 or A14, the plurality of weighting factor lists further includes a fourth list of positive weighting factors having more weighting factors than the first list of positive weighting factors. Selecting the one of the plurality of weighing factor lists based on the predefined criterion further includes one of: in accordance with a determination that the prediction distance is less than a threshold distance, selecting the first list of positive weighting factors; and in accordance with a determination that the prediction distance is equal to or greater than the threshold distance, selecting the fourth list of positive weighting factors.

(A16) In some embodiments of A1, the plurality of weighting factor lists further includes one or more fourth lists of positive weighting factors. Selecting the one of the plurality of weighing factor lists based on the predefined criterion further includes in accordance with a determination that the first prediction block and the second prediction block have different directions with respect to the current image frame, selecting one of the first and fourth lists of positive weighting factors based on a list indicator in a syntax signaled with the current image frame.

(A17) In some embodiments of any of A1-A4 and A11-A12, the plurality of weighting factor lists further includes one or more fourth lists of positive weighting factors. Selecting the one of the plurality of weighing factor lists based on the predefined criterion further includes in accordance with a determination that the first prediction block and the second prediction block have different directions with respect to the current image frame, selecting one of the first and fourth lists of positive weighting factors based on a parity of an MVP index selecting a MVP of the first predication block from a predefined MVP list.

(A18) In some embodiments of any of A1-A4 and A11-A12, the plurality of weighting factor lists further includes a fourth list of positive weighting factors. Selecting the one of the first and fourth lists of positive weighting factors further includes one of: in accordance with a determination that the MVP index is odd, selecting one of the first and fourth lists of positive weighting factors; and in accordance with a determination that the MVP index is even, selecting the other one of the first and fourth lists of positive weighting factors.

(A19) In another aspect, some embodiments include a method 600 implemented (e.g., by an encoding module 340 in FIG. 3) for processing video data. The method 600 includes determining that a current coding block of a current image frame is to be encoded in a WBP mode. The method further includes in response to the current coding block being encoded in the WBP mode, determining that the current coding block is associated with two bi-prediction blocks including a first prediction block and a second prediction block and identifying a plurality of distinct weighting factor lists including at least a first list of positive weighting factors and a second list of mixed weighting factors. The second list has at least one negative weighting factor, and the first list has at least one weighting factor distinct from respective weighting factors in the second list. The method further includes selecting one of the plurality of weighing factor lists based on a predefined criterion, identifying a first weighting factor from the selected one of the plurality of weighing factor lists, and estimating the current coding block by combining the first prediction block and the second prediction block based on the first weighting factor. The method further includes generating a video bitstream including the current coding block of the current image frame.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A19 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A19 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, the method comprising:

receiving a video bitstream including a current block of a current image frame;

when the current block is to be predicted in a weighted bi-prediction (WBP) mode:

determining that the current block is associated with two bi-prediction blocks including a first prediction block and a second prediction block;

identifying a plurality of distinct weighting factor lists including at least a first list and a second list, wherein the first list has all positive weighting factors, wherein the second list has at least one negative weighting factor, and wherein the first list has at least one weighting factor distinct from respective weighting factors in the second list;

selecting one of the plurality of weighing factor lists based on a predefined criterion; and identifying a first weighting factor from the selected one of the plurality of weighing factor lists; and reconstructing the current image frame, including decoding the current block by combining the first prediction block and the second prediction block using the first weighting factor.

2. The method of claim 1, further comprising:

associating the first weighting factor with the first prediction block; and determining a second weighting factor of the second prediction block based on the first weighting factor of the first prediction block;

wherein the first prediction block and the second prediction block are combined using the first weighting factor and the second weighting factor, respectively.

3. The method of claim 2, wherein a sum of the first weighting factor and the second weighting factor is equal to 1.

4. The method of claim 1 wherein selecting the one of the plurality of weighing factor lists based on the predefined criterion comprises:

when the first prediction block and the second prediction block have different directions with respect to the current image frame, selecting the first list of positive weighting factors.

5. The method of claim 1 wherein selecting the one of the plurality of weighing factor lists based on the predefined criterion comprises:

when the first prediction block and the second prediction block have a same direction with respect to the current image frame, selecting the one of the plurality of weighing factor lists based on a prediction distance of the first prediction block.

6. The method of claim 5, wherein the prediction distance is measured (1) between a first reference image frame including the first prediction block and the current image frame or (2) between the first reference image frame and a second reference image frame including the second prediction block.

7. The method of claim 5, wherein the plurality of weighting factor lists further includes a third list of mixed weighting factors having more negative weighting factors than the second list of mixed weighting factors, selecting the one of the plurality of weighing factor lists based on the predefined criterion further comprising one of:

when the prediction distance is less than a threshold distance, selecting the second list of mixed weighting factors; and when the prediction distance is equal to or greater than the threshold distance, selecting the third list of mixed weighting factors.

8. The method of claim 1, wherein the plurality of weighting factor lists further includes one or more third lists of mixed weighting factors each having one or more negative weighting factors, and wherein selecting the one of the plurality of weighing factor lists based on the predefined criterion comprises:

when the first prediction block and the second prediction block have a same direction with respect to the current image frame, selecting one of the second and third lists of mixed weighting factors based on a list indicator in a syntax signaled with the current image frame.

9. The method of claim 1, wherein the plurality of weighting factor lists further includes one or more third lists of mixed weighting factors each having one or more negative weighting factors, and wherein selecting the one of the plurality of weighing factor lists based on the predefined criterion comprises:

when the first prediction block and the second prediction block have a same direction with respect to the current image frame, selecting one of the second and third lists of mixed weighting factors based on a parity of a motion vector predicator (MVP) index selecting an MVP of the first predication block from a predefined MVP list.

10. The method of claim 9, wherein the plurality of weighting factor lists further includes a third list of mixed weighting factors having one or more negative weighting factors, and wherein selecting the one of the plurality of weighing factor lists based on the predefined criterion comprises:

when the MVP index is odd, selecting one of the second and third lists of mixed weighting factors; and when the MVP index is even, selecting the other one of the second and third lists of mixed weighting factors.

11. A method for encoding video data, the method comprising:

receiving video data that includes a current block of a current image frame;

when the current block is to be predicted in a weighted bi-prediction (WBP) mode:

determining that the current block is associated with two bi-prediction blocks including a first prediction block and a second prediction block;

identifying a plurality of distinct weighting factor lists including at least a first list and a second list, wherein the first list has all positive weighting factors, wherein the second list has at least one negative weighting factor, and wherein the first list has at least one weighting factor distinct from respective weighting factors in the second list;

selecting one of the plurality of weighing factor lists based on a predefined criterion; and identifying a first weighting factor from the selected one of the plurality of weighing factor lists; and encoding the current image frame including encoding the current block by combining the first prediction block and the second prediction block using the first weighting factor.

12. The method of claim 11, further comprising:

associating the first weighting factor with the first prediction block; and determining a second weighting factor of the second prediction block based on the first weighting factor of the first prediction block;

wherein the first prediction block and the second prediction block are combined using the first weighting factor and the second weighting factor, respectively.

13. The method of claim 12, wherein a sum of the first weighting factor and the second weighting factor is equal to 1.

14. The method of claim 11, wherein selecting the one of the plurality of weighing factor lists based on the predefined criterion comprises:

when the first prediction block and the second prediction block have different directions with respect to the current image frame, selecting the first list of positive weighting factors.

15. The method of claim 11, wherein selecting the one of the plurality of weighing factor lists based on the predefined criterion comprises:

when the first prediction block and the second prediction block have a same direction with respect to the current image frame, selecting the one of the plurality of weighing factor lists based on a prediction distance of the first prediction block.

16. The method of claim 11, wherein the plurality of weighting factor lists further includes one or more third lists of mixed weighting factors each having one or more negative weighting factors, and wherein selecting the one of the plurality of weighing factor lists based on the predefined criterion comprises:

when the first prediction block and the second prediction block have a same direction with respect to the current image frame, selecting one of the second and third lists of mixed weighting factors based on a list indicator in a syntax signaled with the current image frame.

17. A non-transitory computer-readable storage medium storing a video bitstream that is generated by a video encoding method, the video encoding method comprising:

receiving video data that includes a current block of a current image frame;

when the current block is to be predicted in a weighted bi-prediction (WBP) mode:

determining that the current block is associated with two bi-prediction blocks including a first prediction block and a second prediction block;

identifying a plurality of distinct weighting factor lists including at least a first list and a second list, wherein the first list has all positive weighting factors, wherein the second list has at least one negative weighting factor, and wherein the first list has at least one weighting factor distinct from respective weighting factors in the second list;

selecting one of the plurality of weighing factor lists based on a predefined criterion; and identifying a first weighting factor from the selected one of the plurality of weighing factor lists; and encoding the current image frame including encoding the current block by combining the first prediction block and the second prediction block using the first weighting factor.

18. The non-transitory computer-readable storage medium of claim 17, wherein the video encoding method further comprises:

associating the first weighting factor with the first prediction block; and determining a second weighting factor of the second prediction block based on the first weighting factor of the first prediction block;

wherein the first prediction block and the second prediction block are combined using the first weighting factor and the second weighting factor, respectively.

19. The non-transitory computer-readable storage medium of claim 17, wherein selecting the one of the plurality of weighing factor lists based on the predefined criterion comprises:

when the first prediction block and the second prediction block have different directions with respect to the current image frame, selecting the first list of positive weighting factors.

20. The non-transitory computer-readable storage medium of claim 17, wherein selecting the one of the plurality of weighing factor lists based on the predefined criterion comprises:

when the first prediction block and the second prediction block have a same direction with respect to the current image frame, selecting the one of the plurality of weighing factor lists based on a prediction distance of the first prediction block.

* * * * *